UNITED STATES PATENT OFFICE.

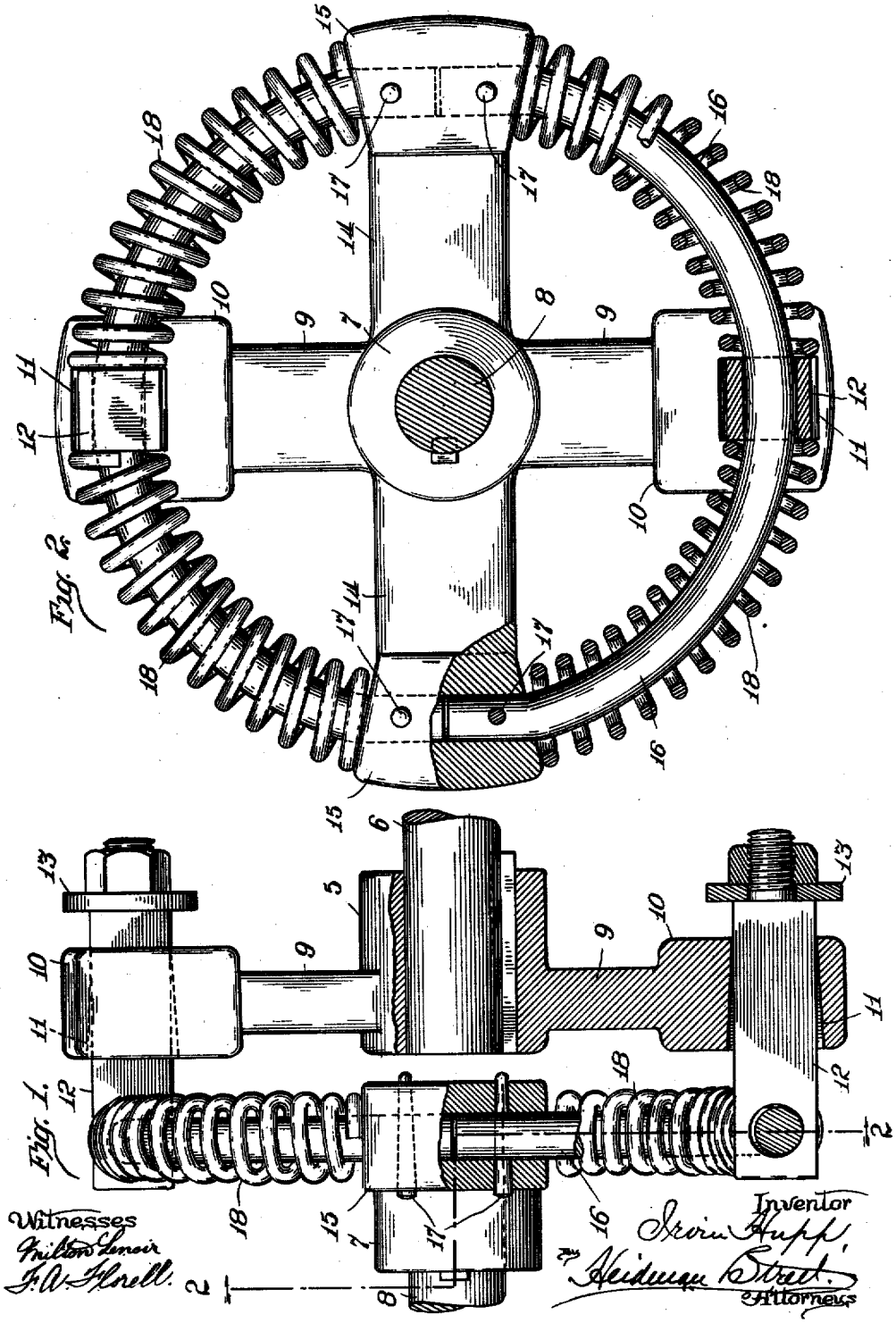

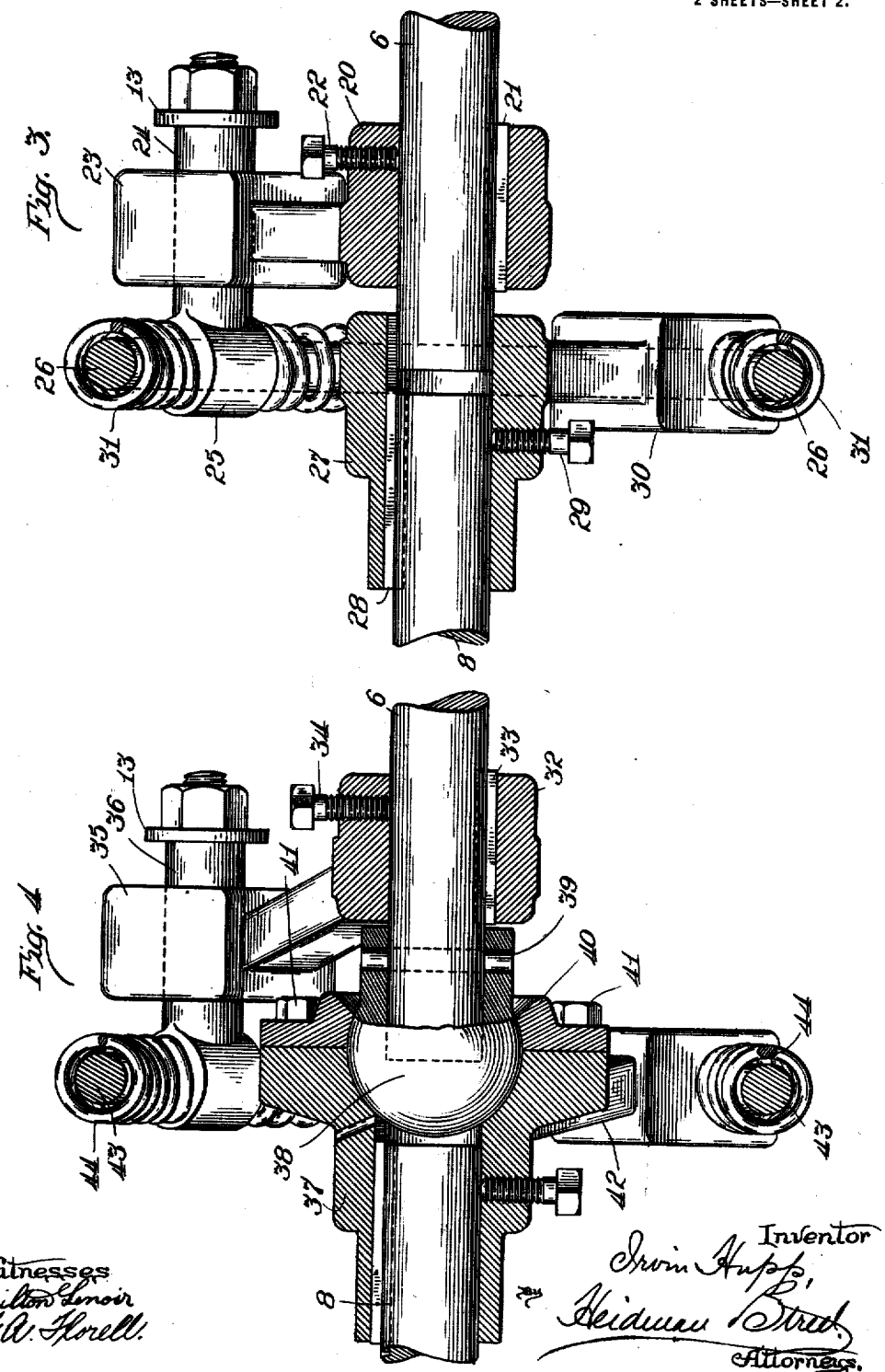

IRVIN HUPP, OF CHICAGO, ILLINOIS, ASSIGNOR TO HUPP, INCORPORATED, A CORPORATION OF ILLINOIS.

FLEXIBLE COUPLING.

1,314,331.   Specification of Letters Patent.   Patented Aug. 26, 1919.

Application filed October 8, 1917. Serial No. 195,269.

*To all whom it may concern:*

Be it known that I, IRVIN HUPP, a citizen of the United States, and a resident of Chicago, in the county of Cook and State of Illinois, have invented certain new and useful Improvements in Flexible Couplings, of which the following is a description, reference being had to the accompanying drawings, which form a part of my specification.
My invention relates more particularly to coupling mechanism, intended to be employed intermediate of a power-imparting element and a driven element, which will "take up" the thrusts or shocks and prevent the transmission thereof from the one element to the other; the mechanism being such that a universal connection or coupling will be provided between the two elements to which it is secured.
My improved coupling is especially applicable for use on automobiles and the like, where it may be employed at any convenient point, as for example, intermediate of the transmission and the differential.
The advantages of the construction will be more fully comprehended from the detailed description of the accompanying drawings, wherein:—

Figure 1 is a side elevation with portions broken away and shown in section.

Fig. 2 is an end view with parts broken away and shown in section.

Fig. 3 is a vertical sectional view, illustrating a modified form of my device, with parts broken away.

Fig. 4 is a similar view of another modification of my invention.

The invention may receive expression in different mechanical forms, as evidenced by the illustrations in the drawings; but in the particular exemplifications it comprises a pair of members or spiders adapted to be secured to the power-imparting and power-receiving element; that is to say, in Figs. 1 and 2, the one member or spider shown at 5 is intended to be rigidly secured or keyed to the driven element or shaft 6 while the other member or spider 7 is adapted to be rigidly secured or keyed to the power-imparting element or drive shaft 8.
The members 5 and 7 comprise central hub-portions adapted to provide sufficient bearing upon the shafts. The hub-portion of member 5 is provided with the radially disposed arms 9, 9 which terminate in the enlarged portions or heads 10, 10. The heads 10, 10 are preferably provided with tapered openings extending therethrough as shown at 11, see Fig. 2, adapted to receive the transversely arranged members or pins 12, 12, which are disposed toward the other member, as clearly shown in Fig. 2. One end of each pin 12 is preferably shown threaded and provided with a suitable nut and washer, as shown at 13, in order to prevent the pins or members 12 from moving entirely through the tapered openings in the heads 10, 10 of the member 5. The openings 11 in the heads taper toward the side of the member 5 which is intended to be disposed toward the member 7.

Member 7, like member 5, has the hub-portion thereof provided with a pair of radially disposed arms 14, 14, the ends whereof also terminate in the enlarged portions or heads 15, 15. These head-portions 15, 15 are provided with openings adapted to receive the ends of the curved bars or semi-circular rods 16, 16. The ends of the pins or members 12, 12 disposed toward member 7, are provided with openings for the passage of the rods or bars 16, 16, as shown to the right in Figs. 1 and 2.

The pins or members 12, 12 are of a length sufficient to permit them to extend into circumferential alinement with the ends of the arms 14, 14 of member 7, and therefore to extend across the space between the ends of the two shafts coupled together by the mechanism, thus enabling the members or rods 16 to pass freely through the ends of pins or members 12 and also permit the ends of members or rods 16 to be secured in the openings in the heads or end portions 15, 15 of arms 14, 14 of member 7. The members or rods 16, 16 may be secured in the arms 14, 14 by means of tapered pins 17, or other suitable means; the rods being secured in place after the coupler has been properly assembled. The bars or rods 16 are intended to pass freely through the openings in the pins or members 12; in other words the connection between the members or rods 16 and pins or member 12 is a sliding one in order to permit the arms 9 and 14 of members 5 and 7, respectively, to independently move through the arcs of circles.

The composite circumferential member or rod 16 is preferably made in two parts, as shown, in order to permit of the assembling of the parts and to enable the threading or insertion thereon of the various coil-springs 18. As shown in Fig. 1, the coupler also comprises a set of compression springs 18; a spring being placed on opposite sides of the heads or ends of the arms of both members 5 and 7; so that with a construction of the type shown in the drawing, at least four springs are employed because each member 5 and 7 is provided with a pair of extensions or arms.

In assembling the coupler, the rods or members 16 are first passed through the holes in the ends of pins or members 12; that is, one pin or bolt 12 is placed on each section of the composite member or rod 16. This is preferably done before the pins or bolts 12 are inserted in the openings 11 in the arms 9 of member 5. The ends of the member or rod 16, on opposite sides of the bolts or pins 12, are then each provided with a compression spring section 18, so that one end of each spring will bear against the opposite side of each pin or member 12.

The spring-sections 18 are of such length that they will be under slight compression intermediate of both heads 15, 15 of the member 7 and both sides of each pin or member 12, secured in the heads 10, 10 of member 5, when the coupler is assembled.

After the spring-sections 18 have been put into place or threaded on the ends of sections of composite member 16, the ends of the rod-sections 16, 16 are then inserted into the openings of heads 15, 15, and secured in place, as for example by means of the tapered pins 17. By making the composite member or rod 16 of two similar or semi-circular portions, it is apparent that the coupler may be readily assembled. It will be understood from the foregoing description and from the drawing that with the spring-sections 18 all of substantially the same tension or strength, the two members 5 and 7 are preferably secured to their respective shafts or elements so that the arms of said members will be disposed substantially 90 degrees apart, as shown.

It is evident from the construction shown that the two shafts will be operatively secured together by a resilient or flexible means which is adapted to yieldingly transmit the power from the power shaft through said coupler to the driven shaft, but without imparting the thrusts or shocks which may be encountered by one portion of the coupler.

The coupler is preferably given the spider formation and keyed or otherwise secured to the respective shafts, in the criss-cross manner shown; that is the members are so secured to the drive element or shaft and the driven element or shaft that the spring-engaging surfaces of the two elements will be disposed in the same circumferential plane, approximately ninety degrees apart when the mechanism is in normal position, and all the spring-sections 18 normally maintained under slight compression.

The openings 11 in the ends of the arms 9 of member 5 are tapered with the flare or larger end of the opening disposed toward the member 7, thus permitting the bolts or pins 12 to have considerable lateral play or oscillatory and sliding movement when necessary and thereby provide a device which practically constitutes a flexible coupler between the drive and driven elements adapted to have more or less play or universal movement. This permits the mechanism to be employed in situations where the drive-shaft and the driven-shaft are not in the same plane or absolutely in direct alinement with each other.

In the preferred construction, the members or pins 12 are preferably threaded at their one end to receive the washers and nuts 13, which are put into place after the device has been assembled; this construction permitting the device to be more readily put into place.

The springs 18, as previously stated, are inserted under sufficient compression so that when the springs between the forwardly presented faces of the heads 15 and members or pins 12, relative to the direction of movement or rotation of the member 7 on the driving shaft, are further compressed by reason of such relative movement, the springs on the opposite sides of each head 15 and bolts or members 12 will be under sufficient compression to permit the amount of expansion and still maintain the ends of all springs in contact with their respective abutting surfaces.

As is apparent from the construction shown, when power or driving shaft 8, to which member 7 is secured, is rotating forwardly or in clockwise direction in Fig. 1, the thrust is taken up and power transmitted to the driven member or shaft 6, on which member 5 is secured, through the spring-section 18 mounted to the right of arm 14 at the top of the construction in Fig. 1 and the spring-section 18 mounted to the left of arm 14 at the bottom of the construction in Fig. 1. If the shaft 8 is rotated in the opposite direction, then the spring to the left of arm 14 at the top of the device in Fig. 1 and the spring 18 to the right of arm 14 at the bottom of the device in Fig. 1 will take up the thrust and yieldingly transmit the power to driven shaft 6 in the opposite or unclockwise direction through the medium of the bolts or members 12 and spider member 5; while the other pairs of springs will functuate or come into play and absorb or yieldingly take care of inertia encountered for example when a difference in degree of movement exists between the driving element or shaft and the driven element or shaft; and the lateral play which bolts or members 12 may have, due to the flare in the openings 11, enables the coupler to be employed regardless of whether the drive-shaft and driven shaft are in absolute alinement with each other or not. The composite circular member or rod-sections 16 will maintain the springs in proper position or direct alinement with their respective abutting surfaces and prevent any sidewise or lateral movement, especially where the two shafts are not in direct alinement with each other and therefore in situations where the two members 5 and 7 are not in absolute parallel relation with each other.

In Fig. 3 I illustrate a modified form of the invention wherein the member or spider 20 is substantially similar in construction to member 5 in Figs. 1 and 2; being keyed to the driven element or shaft 6 by means of a suitable key illustrated at 21 and held against movement longitudinally of the shaft by means of a suitable set screw 22.

In this modification, the head or enlarged portions 23 of the spider or member 20 are each provided with a hole extending transversely therethrough to receive a bolt or pin 24 arranged to permit a sliding connection between each bolt 24 and the spider or member 20. In this construction the bolt or member 24 is provided with an enlarged head-portion 25 having an opening therethrough for the passage of the circumferential member or semi-circular rod-section 26 which latter may be similar in construction to member 16 in Fig. 2. The bolts or members 24 have their opposite or free ends preferably somewhat reduced and threaded to receive the washers and nuts indicated at 13 whereby accidental withdrawal of the bolts or pins from the spider or member 20 is prevented. The rods or members 24 are made of sufficient length to permit transverse or sliding movement.

The drive-shaft 8 is provided with a member or spider 27 having an elongated hub-portion adapted to receive the end of the drive-shaft 8 as well as the end of the driven-shaft 6; the latter shaft having a running fit in the hub of member 27, while the drive-shaft 8 is keyed thereto, as shown at 28, and the member 27 held against movement longitudinally of shaft 8 by a suitable set-screw 29.

Both members 20 and 27, like members 5 and 7, are provided with a pair of radially disposed arms terminating in heads or enlarged portions, with the enlarged or head-portions of the arms of member 27 adapted to receive the ends of the rod-sections 26, which are maintained in place by means of pins, as shown at 17 in Fig. 1, or in any other suitable manner. The rod-sections 26, like the rod-sections 16, are intended to have sliding relation with the bolts or members 24 which are adapted to extend into the circumferential plane described by the arms 30 of member 27 and at suitable degrees or distances removed in a circumferential direction from said arms in order to permit the insertion of suitable spring-sections 31 on the rod-sections 26, namely with one end of each spring-section bearing against opposite sides of the heads of each bolt of member 24, while the opposite ends of said spring-sections bear against the arms 30 of member 27. In other words, where the spiders or members are each provided with a pair of arms, it is evident that four spring-sections will be employed in the mechanism, to-wit at least one spring-section between the opposing surfaces of each bolt or member 24 and each arm 30 of member 27.

The construction is assembled in the same manner as the construction shown in Figs. 1 and 2 and previously described, with the spring-sections preferably under slight compression when the mechanism is in inactive or normal condition; and it is evident that with the power-imparting and driven shaft sections entering the hub-portion of member 27, oscillatory movement of the one spider or member, relative to the other, will be obviated and the shaft-sections maintained in proper alinement with each other.

In Fig. 4 I illustrate another modification of the invention, wherein a ball and socket relation between the driven shaft 6 and the power shaft 8 is provided. In this construction, the driven shaft 6 is provided with the spider or member 32 keyed to the shaft by means of key 33 and held against movement longitudinally of the shaft 6 by means of set-screw 34. The member is provided with a pair of radially disposed arms which preferably terminate in enlarged ends or head-portions 35, provided with openings therethrough for the passage of the bolts or members 36; it being understood that each arm is provided with a bolt or member 36. The bolts or members 36 are shown similar in construction to the bolts or members 24 shown in Fig. 3, being adapted to have not only transverse or sliding engagement with the member 32, but also being permitted to have considerable lateral or sidewise play similar to the bolts or members 12 in Figs. 1 and 2.

The member 37 secured to the drive or power-imparting shaft 8 is provided with an enlarged hub-portion formed to provide a socket for the reception of the ball-member 38 which is secured to the end of the driven shaft 6 in any suitable manner, as for example by the pin 39 shown passing through the extended portion of the ball 38 and the shaft 6. In order to maintain the ball and socket relation between the two shafts, I provide a suitable cap-member 40 adapted to be inserted onto the extended portion of the ball 38 before the latter has been secured to shaft 6. This cap-portion 40 is then securely bolted to the hub-portion of member 37 by means of bolts, as shown at 41. Member 37, like the previously described constructions, is provided with radially disposed arms 42 preferably terminating in enlarged portions or heads having sockets or openings therein to receive the ends of the semi-circular rods or members 43. The rods 43 pass through the ends or head-portions of bolts or members 36 and have free sliding relation therewith, while the ends of the rod-sections 43 are firmly secured in the ends of the arms 42 of member 37 by pins, as illustrated in Fig. 1, or other suitable means. The rod-sections 43, like those in the previously described constructions, are encircled by suitable spring-sections 44; one end of each section abutting against the end of arms 42 of member 37, while the other end abuts against the end of bolt-members 36.

This construction, like the previously described constructions, shows the spiders or members 32 and 37 each provided with a pair of radially disposed arms, with each member so secured to its respective shaft as to have the bolts or members 36 extend into the same circumferential plane as the arms 42 of member 37 but at a predetermined distance or number of degrees apart so as to permit the insertion of spring-sections 44 intermediate of the opposing surfaces of bolt-members 36 and arms 42. With the construction shown in Fig. 4, it is apparent that my improved coupler is adapted for use in situations where the drive shaft and the driven shaft may not be at all times in absolute alinement with each other, while at the same time power will be transmitted in a yielding manner from the power shaft to the driven shaft without however imparting the thrusts or shocks.

I have shown and described what I believe to be the simplest and best forms of my invention, but the invention may be expressed in somewhat different mechanical form without, however, departing from the spirit of the invention.

What I claim is:—

1. A coupling of the class described, comprising a pair of members provided with radially disposed arms, one member being adapted to be fixedly secured to a rotatable driving element or shaft, while the other is adapted to be fixedly secured to a rotatable driven element or shaft, the arms of one member being provided with portions adapted to extend into the circumferential plane to be described by the arms of the other member, said portions being adapted to have transverse and lateral movements relative to the arms of said member, and flexible means disposed between said movable portions and the arms of the other member, whereby rotative movement of the driving element will be yieldingly transmitted to the driven element.

2. A flexible coupling, comprising a pair of members provided with radially disposed portions, one of the members being adapted to be fixedly secured to a rotatable driving element, while the other is adapted to be fixedly secured to a driven element, means secured to the radially disposed portions of one member so as to have free in and out and lateral movement, said means being arranged to extend into the circumferential plane adapted to be described by the radially disposed portions of the other member, and a plurality of compression elements disposed between the means secured to the radially disposed portion of one member and the radially disposed portion of the other member whereby rotative movement of the driving element will be yieldingly transmitted to the driven element.

3. A flexible coupling, comprising a pair of members having radially disposed arms, one of the members being adapted to be fixedly secured to a rotatable driving element while the other is adapted to be secured to a rotatable driven element, with the arms of the one member arranged substantially ninety degrees apart from the arms of the other member when in normal position, members loosely mounted in the arms of one member and arranged to extend into the circumferential plane of the arms of the other member, said members being adapted to have transverse and lateral movement, and a plurality of compression elements disposed between said loosely mounted members and the radially disposed arms of the other member.

4. A flexible coupling, comprising a pair of members provided with radially disposed portions, one member being adapted to be rigidly secured to a driving element while the other is adapted to be fixedly secured to a driven element, members loosely mounted on the radially disposed portions of the one member, arranged to have lateral and transverse movement and adapted to extend into the circumferential path of the arms of the other member, means extending through the arms of one member and through the ends of said loosely mounted members on the arms of the other member, and flexible means disposed intermediate of said loosely mounted members and the arms of the adjacent member whereby rotative movement of the driving element is yieldingly transmitted to the driven element.

5. A flexible coupling, comprising a pair of members provided with radially disposed arms, one member being adapted to be fixedly secured to a rotatable driving element, while the other is adapted to be fixedly secured to a rotatable driven element, the arms of one member being provided with loosely mounted portions arranged to have transverse and lateral movement and to extend into the circumferential plane of the radially disposed arms of the other member, flexible means disposed between the radially disposed arms of one member and said movable portions of the other member whereby rotative movement of the driving element will be yieldingly transmitted to the driven element, and means whereby said flexible means are maintained in direct alinement with the arms of one member and said movable portions of the other member.

6. A flexible coupling, comprising a pair of members provided with radially disposed arms, one member being adapted to be rigidly secured to a rotatable driving element while the other member is adapted to be fixedly secured to a rotatable driven element, transversely disposed portions mounted in the arms of one member so as to have transverse and lateral movement and to extend into the circumferential plane of the arms of the other member, compression springs arranged intermediate of the ends of said transversely disposed portions and the arms of the other member, and circumferential means whereby said compression springs will be maintained in direct alinement with said transversely disposed portions and said arms.

7. A flexible coupling, comprising a pair of members provided with radially disposed arms, one member being adapted to be fixedly secured to a driving shaft while the other member is adapted to be fixedly secured to a driven shaft, the arms of one member being provided with portions having free radial and axial movement and to extend into the circumferential plane of the arms of the other member, and a plurality of compression springs disposed between both sides of said portions and the arms of the other member so that a portion of said springs will yieldingly transmit movement from the driving member to the driven member when the former rotates in one direction while the other portion of said springs are yieldingly transmitting rotative movement to the driven member when the driving member rotates in the opposite direction.

8. A flexible coupling, comprising a pair of members, one of which is adapted to be fixedly secured to a rotatable driving element, while the other member is adapted to be fixedly secured to a rotatable driven element, one of the members being provided with loosely mounted portions disposed transversely into the circumferential path of the other member and arranged to have free radial and axial movement, and a plurality of compression elements so arranged between said portions and the other member that one portion of the compression elements will yieldingly transmit movement from one member to the other while the other portion of said compression elements will take up any rotative back thrusts.

9. A flexible coupling, comprising a pair of members, one of which is adapted to be fixedly secured to a rotatable driving element while the other is adapted to be secured to a rotatable driven element, loosely mounted transversely disposed portions intermediate of said members adapted to have transverse and lateral movement, and a plurality of compression springs disposed on opposite sides of said transversely disposed portions adapted to yieldingly transmit movement from one member to the other.

10. A flexible coupling, comprising a pair of members, one of which is adapted to be fixedly secured to a rotatable driving element while the other is adapted to be fixedly secured to a rotatable driven element, transversely disposed means loosely mounted in one of said members and adapted to extend into the circumferential plane described by the other, and a plurality of circumferentially arranged resilient elements disposed intermediate of said transversely disposed means and opposing portions of the adjacent member disposed in the same circumferential plane so as to yieldingly transmit movement from the one member to the other.

11. A flexible coupling, comprising a member adapted to be fixedly secured to a drive shaft so as to rotate therewith and having radially disposed portions, a second member adapted to be fixedly secured to a driven shaft so as to rotate therewith and arranged in juxtaposition to said first member, a ball-and-socket connection between one of said members and the adjacent shaft whereby a movable relation between the adjacent ends of the two shafts is provided, the one member being provided with transversely disposed portions adapted to have free radial and axial movement and to extend into the circumferential path of the other member, and compression means disposed intermediate of said portions and the other member whereby rotative movement in either direction will be yieldingly transmitted from one shaft to the other.

12. A flexible coupling, comprising a pair of members, one of which is adapted to be fixedly secured to a drive shaft while the other is adapted to be fixedly secured to a driven shaft, a spherical member mounted in the hub of one of said members and adapted to be secured to the end of the adjacent shaft, the first mentioned members being provided with opposing portions disposed in the same circumferential plane, some of said portions being arranged to have free radial and axial movement, and compression springs arranged intermediate of the opposing portions of both members so that rotative movement in either direction will be yieldingly transmitted from one shaft to the other and a non-alined relation between the adjacent ends of the shafts permitted.

13. A flexible coupling, comprising a pair of members, one of which is adapted to be fixedly secured to a rotatable driving shaft while the other is adapted to be fixedly secured to a rotatable driven shaft, the one member being provided with transversely disposed portions adapted to extend into the circumferential plane described by the other member, said portions being adapted to have free radial and axial movement, a circumferential element disposed through said portions of the one member and the circumferentially alined portions of the other member, and compression springs encircling said element and disposed between the one member and said portions of the other member so that rotative movement in either direction will be yieldingly transmitted from one member to the other member.

14. A flexible coupling, comprising a pair of members adapted to be fixedly secured to the adjacent ends of two shafts so as to rotate therewith, the members being provided adjacent the peripheries thereof with opposing portions disposed in the same circumferential plane, a ball-and-socket connection intermediate of one of said members and the end of the adjacent shaft whereby a rocking relation between the adjacent ends of the two shafts is provided, and compression elements arranged intermediate of the opposing portions of both members whereby rotative movement of one shaft is yieldingly transmitted to the other shaft, some of said opposing portions being arranged to have free radial and axial movement.

15. A flexible coupling, comprising a pair of members, one of which is adapted to be fixedly secured to a drive shaft while the other is adapted to be fixedly secured to a driven shaft, a spherical member mounted in the hub of one of said members and adapted to be secured to the end of the adjacent shaft, the pair of members being provided with opposing portions disposed in the same circumferential plane, with some of said portions arranged to have free radial and axial movement, compression springs arranged intermediate of the opposing portions of said pair of members so that rotative movement in either direction will be yieldingly transmitted from one shaft to the other and a non-alined relation between the adjacent ends of the shafts permitted, and means whereby said compression springs are maintained in alinement with the opposing portions of said pair of members.

16. A flexible coupling, comprising a pair of members having hub-portions and radially disposed portions, the hub portions being adapted to receive the adjacent ends of two shafts and be secured thereto so as to rotate with said shafts, a ball-and-socket connection intermediate of the hubs of both members, the radially disposed portions of the two members being provided with opposing surfaces arranged substantially in the same circumferential plane, some of said surfaces being adapted to have free radial and axial movement, and compression springs arranged circumferentially intermediate of the opposing surfaces of both members so as to yieldingly transmit the rotative movement of the one shaft to the other shaft.

IRVIN HUPP.

Witnesses:
GEORGE HEIDMAN,
F. A. FLORELL.

Copies of this patent may be obtained for five cents each, by addressing the "Commissioner of Patents, Washington, D. C."